INVENTOR:
Carl H. Savit
AGENT

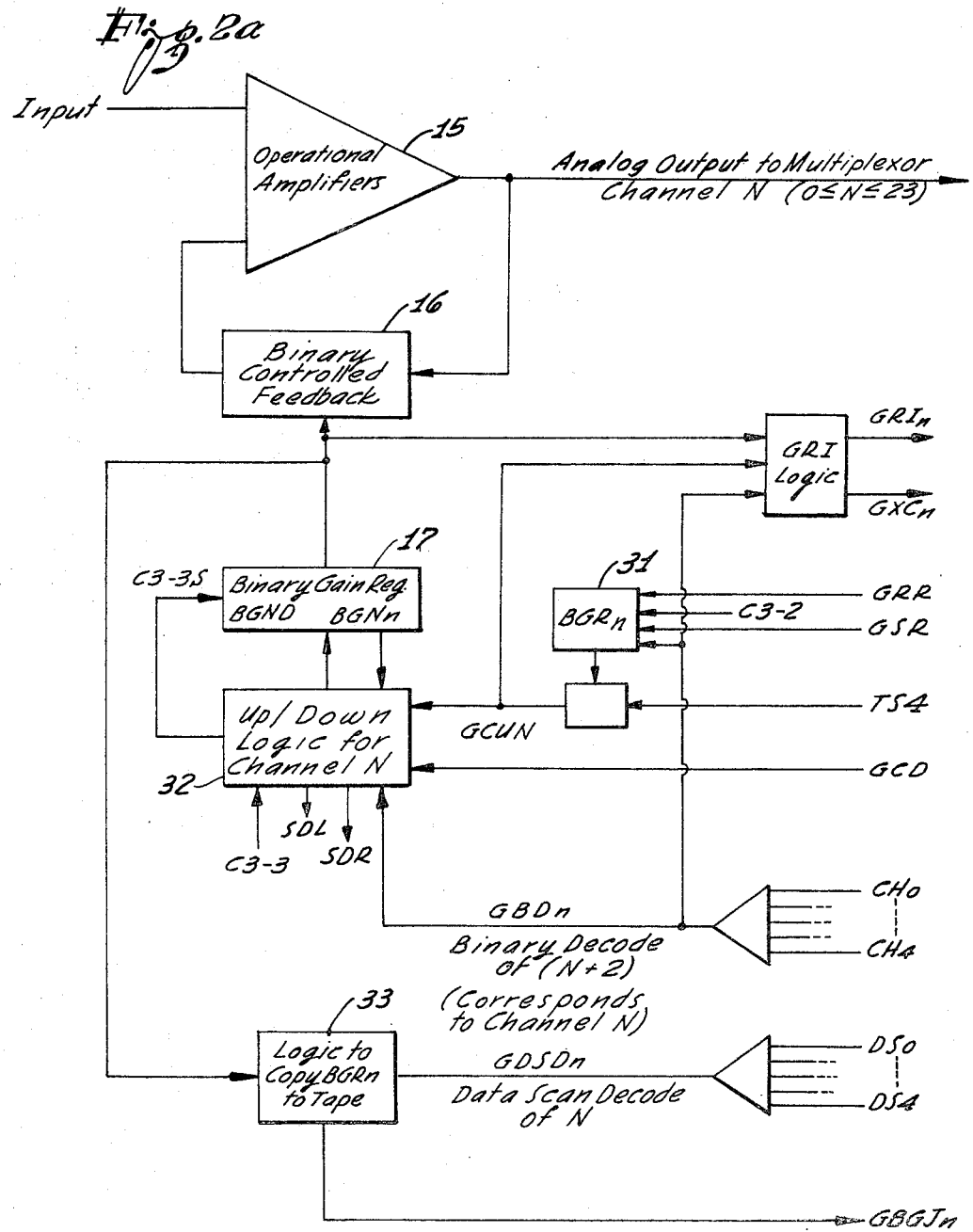

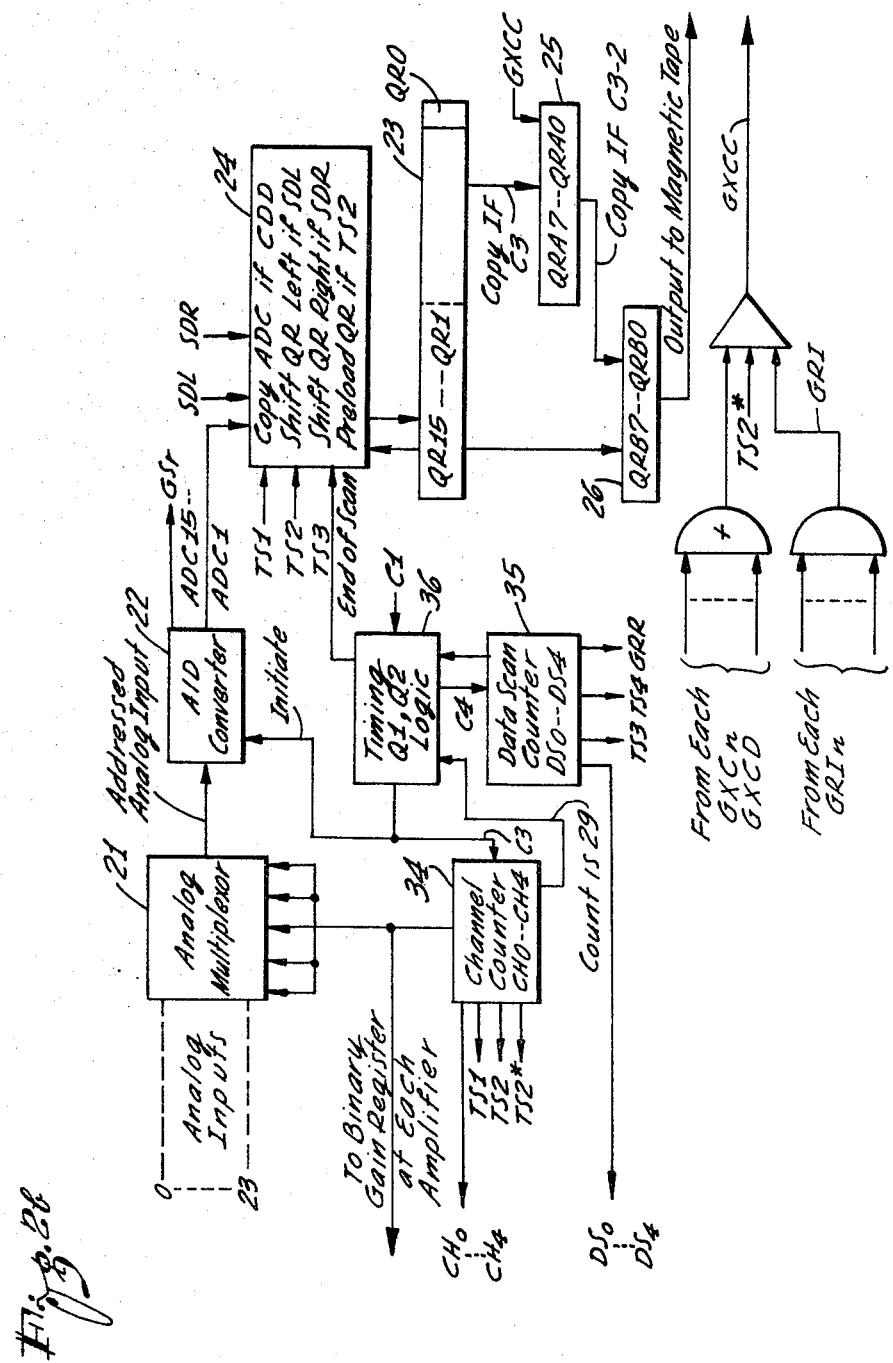

INVENTOR:
Carl H. Savit

AGENT

United States Patent Office 3,436,723
Patented Apr. 1, 1969

3,436,723
DIGITAL RECORDING APPARATUS
Carl H. Savit, Van Nuys, Calif., assignor to Western Geophysical Company of America, Los Angeles, Calif., a corporation of Delaware
Filed Nov. 14, 1966, Ser. No. 593,781
Int. Cl. G01v 1/00
U.S. Cl. 340—15.5
6 Claims

ABSTRACT OF THE DISCLOSURE

A method of digitally recording seismic data from a plurality of channels, each channel including a variable gain amplifier. The method includes the steps of recording on a tape with several recording tracks a digital indication of the initial gain value of each amplifier, sequentially digitizing the data output of each amplifier, providing a digital indication of a change in each amplifier gain, and recording the digitized data together with the digital indication of the change on the recording medium.

Figure 1:
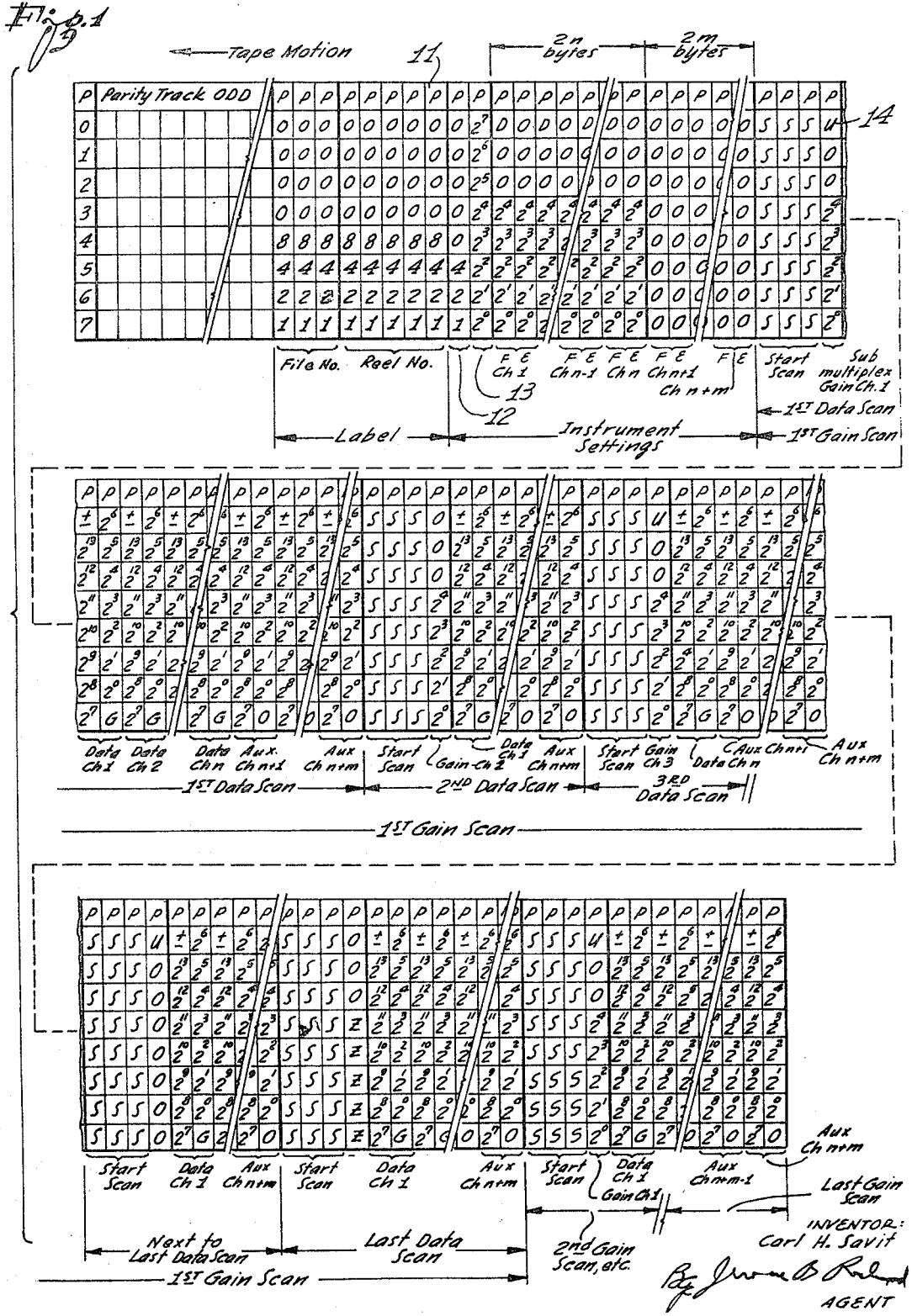

The present invention relates to digital recording and more particularly to digital recording of seismic data.

Geophysical data is frequently obtained by detonating an explosive charge and recording the resultant seismic energy as received by a number of geophones. In the past all of the geophone signals were recorded in analog form, either as an oscillograph trace or, more recently, on magnetic tape. Since digital computers presently used for data reduction of the recorded data, it is desirable to record the seismic returns directly in digital form. Nine track magnetic tapes have become standard in the digital processing field. Therefore, it is desirable that the seismic data furnished by the geophones be converted into digital form and recorded as accurately as possible on nine-track magnetic tape.

As is well known to those skilled in the art, the intensity of signals received by the geophones and operated upon by the amplifiers varies over an extremely large dynamic range. Therefore, to avoid overloading the amplifier by extremely strong pulses arriving from the explosive charge and at the same time to provide enough gain to enable a usable signal to be received from very weak reflected signals, the gain of each seismic amplifier must be varied. To more easily enable data processing by digital computers, binary gain amplifiers have been developed. In these amplifiers, gain is varied by indiscrete steps of powers of two. In order to determine the absolute amplitude of a given data sample it will be apparent that the gain of the amplifier must be recorded on the tape, as well as the digital value of the output signal of the amplifier. In accordance with this invention initial amplifier gains are preselected and recorded for each channel. Each channel is then scanned sequentially, and the digitized seismic data is recorded. Since amplifier gain may vary by one binary digit during the process of scanning each of the seismic channels sequentially, any change in gain from the initially recorded preselected gain setting must be recorded along with the digitized seismic data. In addition, the absolute gain from one of the channels is recorded at the beginning of each data scan.

Each data value is contained in two, eight-bit characters, each of which is known as a byte. Thus, two bytes provide a sixteen bit data word. The seismic data is located in the most significant fifteen bits. The remaining bit holds the gain change indicator. Placement of the gain changing indicator bit in the least significant bit position permits processing data without shifting or masking to eliminate the extra bit because the error introduced by this retention is random, occurs rarely and is limited to one-half the least significant valid bit. Since amplifier gain is controlled in a binary manner, a bit in the least significant position indicates a two-to-one, or six db change in gain.

To accommodate both increases and decreases in gain with only one bit available, increases of gain are permitted to occur only on certain scans and decreases are permitted to occur only on the remaining scans. If the data in a channel is such as to require an increase in gain, that increase will be made on the next odd number scan and will be recorded with a one in the sixteenth bit of the appropriate data sample on that same scan. Thus, a one in the least significant position of a data word on odd scans indicates an increase of one in the exponent, while a one in the same position on an even number scan would indicate a decrease of one in the exponent.

In addition, a redundant check of amplifier gain is provided. The actual numerical value of the gain is submultiplexed into the five least significant bits of the fourth byte of the start of scan indicator, at the start of each scan, that is the submultiplexed gain is the initial gain setting plus the algebraic sum of all of the up-and-down gain changes since the start of recording.

It is, therefore, an object of this invention to provide an improved method for digitally recording seismic data.

Another object of this invention is to provide an improved method for magnetically recording digitized seismic data in binary form.

Another object of this invention is to provide an improved method for magnetically recording digitized seismic data in a form providing a maximum amount of useful data in a minimum amount of tape.

These and other objects and advantages of the present invention will become apparent from the following specifications and accompanying drawings, wherein:

FIGURE 1 schematically illustrates the recorded tape resulting from the present invention.

Figure 3A:
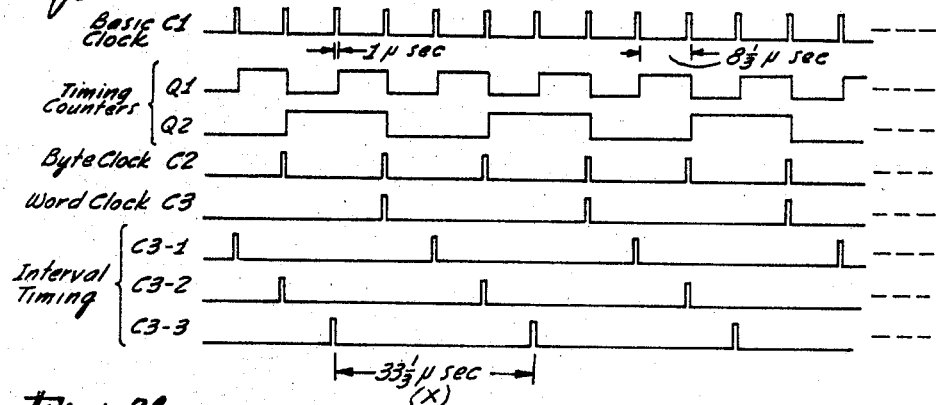
Figure 3B:
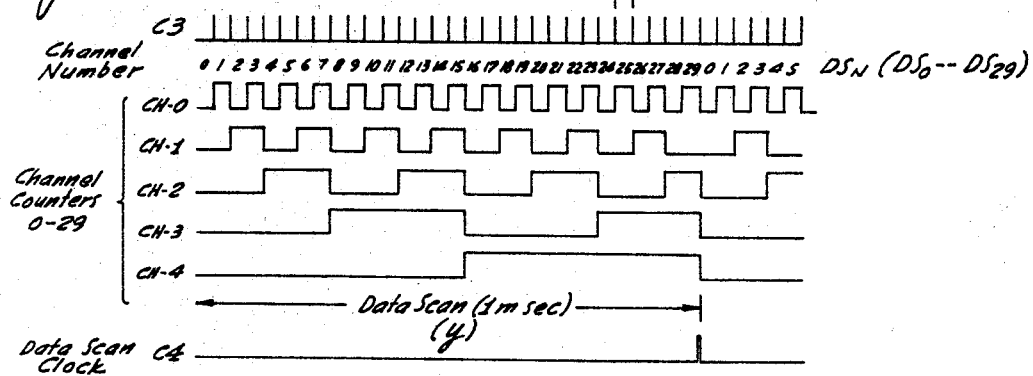
Figure 3C:
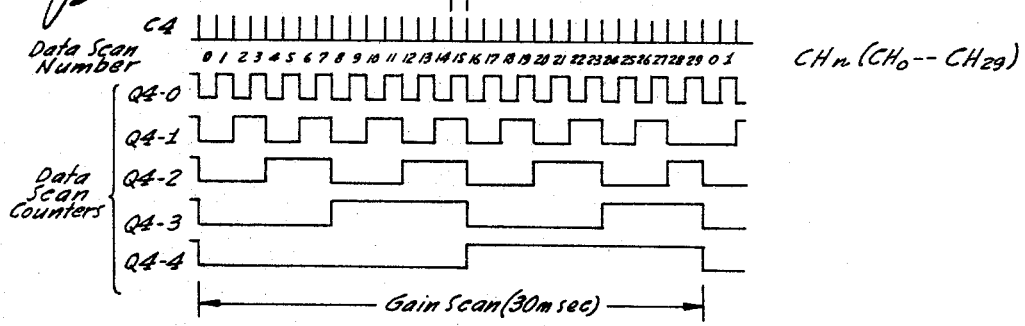

FIGURES 2a and 2b schematically illustrate a functional block diagram for implementing the present invention; and FIGURES 3a, 3b and 3c are timing diagrams illustrating the operation of FIGURES 2a and 2b.

Referring now to FIGURE 1, a length of magnetic tape having seismic data signals recorded thereon in accordance with the present invention is illustrated. Conventional half-inch nine-track magnetic tape is employed, of the type widely employed and well known in the computer art. Parity track 11 has signals recorded thereon by a parity generator, of the type well known to those skilled in the art. The parity signal employed in the present invention may be of any type required by the computer that will process the tape. However, in a preferred embodiment, an odd parity signal is provided. In addition to the parity track, eight data tracks are included. The data tracks are successively numbered from top to bottom in FIGURE 1. The actual track positions, from top to bottom, are 4, 6, 0, 1, 2, parity, 3, 7 and 5.

Tape identification data is first recorded on the tape in the area marked "label." The label data is recorded in a binary-coded decimal arrangement on tracks 4, 5, 6, and 7 with one decimal digit being recorded in each byte. Thus, a three-decimal-digit file number and a five-decimal-digit reel number may be recorded. Additional identification data may be inserted in the following bytes. For example, the sampling interval may be inserted in byte 12 and the serial number of the recording equipment may be inserted in byte 13. Further fixed data may be inserted following byte 13, if desired.

Following the fixed data, the instrument settings may be recorded. The instrument settings are recorded in two bytes per data channel. The first byte specifies the fixed gain of the channel and the second byte specifies the early gain. Early gain represents the amount of presuppression set into the amplifier to prevent a large initial signal from saturating the amplifier, which would happen if the gain were at its normal setting. The fixed gain represents the threshold gain of the recording amplifier needed to record the first received seismic reflections.

There are "$n$," usually twenty-four, variable-gain channels, each connected to at least one geophone. In addition there will be "$m$," normally five auxiliary channels which do not have variable gain. After the instrument settings have been recorded, a start scan signal is applied to the tape to indicate to the computer that the following data are seismic recordings. The start scan signal consists of three bytes having "1's" in each track. Following the start scan signal, the explicit gain of channel 1 is recorded on the tape as a fourth byte and the seismic data signals of channel 1, channel 2, channel "$n$," and channel "$n+m$" are then recorded. The data from each channel represents the analog signal from the appropriate amplifier, digitized into a fifteen bit word. Since there are six-bits available in the two bytes, the remaining bit in the word is employed to indicate a change in the gain of the binary gain amplifier. Placement of the gain change indicator bit in the least significant bit position permits processing data without shifting or masking to eliminate the gain change bit because any error introduced in the least significant place is random, occurs rarely and is limited to one-half the least significant valid bit. The gain change indication is represented by the letter "G" in FIGURE 1.

If the magnitude of a digitized value is one-half of full scale or larger, a gain change downward will occur. The down gain change is inticated by putting a "1" indication at the "G" position. The "1" indicates that there has been a change in amplifier gain. On the other hand, if the data is less than one-fourth of full scale in magnitude, the gain is increased. An increase in gain is indicated by placing a "1" in the "G" position to indicate the gain change. It will be noted that the "1" in the gain change position may indicate either an increase or decrease in gain. This ambiguity is resolved by providing that an increase in gain can occur only during odd numbered scans and decreases in gain can occur only during even numbered scans. When an increase in gain is allowed on a particular scan, an upchange indication is placed in the start-scan indicator block in the same byte as that in which the explicit gain of channel 1 is recorded, as for example, the "$u$" indicated in FIGURE 1 at 14. Thus, a "1" in the "$u$" position indicates that any changes of gain in that particular data scan are gain increases.

The seismic data from each of the "$n+m$" channels are recorded sequentially during the first data scan. After the digitized data from all of the channels has been recorded, a second data scan is recorded. The start scan signal, schematically indicated by "S's" in FIGURE 1, consists of three bytes of "1's" on the tape. The start scan signal indicates to the computer that second data scan is starting. On the fourth byte, the explicit gain of channel 2 is recorded. Since there is no "$u$," or upchange, indication in this byte, any gain changes in this data scan will be down changes. Data from each channel is then recorded in two bytes as previously disclosed. A total of "$n+m$" data scans are recorded, including "$n$" variable gain data channels and "$m$" fixed gain auxiliary channels. The "$n+1$" auxiliary channel data scan does not have any explicit gain recorded for that channel, nor do any of the other of the "$m$" auxiliary channels. An end of gain scan signal is recorded, consisting of five "1's," as indicated by "$z$" in FIGURE 1 at the explicit gain position for channel "$n+m$." This will indicate to the computer that the data scan following is the final data scan of that gain scan. From this, it is seen that each gain scan consists of "$n+m$" data scans. The entire process is repeated in a second gain scan, starting with the "1's" start-scan indication, and recording of the explicit gain of channel 1.

The data from each channel is recorded as in the first gain scan. Additional gain scans are recorded, dependent upon the length of the tape available and the amount of data required. Referring now to FIGURES 2a and 2b, a philosophical block diagram is illustrated indicating a manner of mechanizing the present invention. A plurality of operational amplifier 15 are each connected to a geophone (not shown). The gain of each amplifier is controlled by a binary controlled feedback circuit 16 which is, in turn, controlled by a binary register 17. The output of amplifier 15 is applied to a multiplexer 21, wherein the output of each amplifier is successively connected to an analog-to-digital converter 22. The digital output of the analog-to-digital converter 22 is applied to a sixteen bit register 23 through a logic circuit 24. The sixteen-bit register 23, in turn, feeds two eight-bit registers 25 and 26, since the tape will accept only eight bits at each byte. The operation of the registers 23, 25 and 26 are sometimes referred to in the trade as a tape formatter.

Up and down gain shifts are controlled by logic circuits, 31 and 32, while recording of any gain shifts is controlled by logic circuit 33. Multiplexer 21 and each binary gain register, such as 17, are controlled by channel counter 34. The data scans are controlled by data scan counter 35. The timing of the various signals is controlled by timing logic 36.

As illustrated in FIGURE 3, timing logic includes a basic clock providing one microsecond pulses, 8⅓ microseconds apart. The basic clock pulses drive timing counters $Q_1$ and $Q_2$ which feed pulse generators to provide byte clock pulses and word clock pulses $C_3$. The word clock pulses are 33⅓ microseconds apart. The word clock pulses drive channel counters $CH_0$ to $CH_4$, as illustrated in FIGURE 3b, and also drive data scan clock $C_4$ with pulses one millisecond apart. The one millisecond-spaced data scan pulses actuate data scan counter $Q_4$-0 to $Q_4$-4. The block diagram of FIGURES 2a and 2b and the timing diagram of FIGURE 3a will assist in the understanding of the logic of the present invention, disclosed hereinbelow.

*Definitions*

$CH_0$–$CH_4$ form a five flip-flop modulo counter,
$DS_0$–$DS_4$ form a five flip-flop modulo counter,
$QR_1$–$QR_{15}$ form a fifteen bit holding register,
$QRA_0$–$QRA_7$ form an eight bit holding register,
$QRB_0$–$QRB_7$ form an eight bit holding register, to drive the magnetic tape unit,
$BG_{000}$–$BG_{004}$ form a five bit register controlling the binary gain of channel 00,
$BG_{010}$–$BG_{014}$ form a similar register for channel 01,
$BG_{230}$–$BG_{234}$ form a similar register for channel 23 (the 24 channels are numbered 0–23),
$ADC_{15}$–$ADC_1$ are the 15 output leads of the A/D converter. The flip flops employed have five synchronous inputs.

They are:

$S_1$, $S_2$—set term and gate
$R_1$, $R_2$—reset term and gate
T—Clock (changes at the fall of clock signal)

A binary (or trigger) flip flop can be generated by cross coupling an output to its opposite input. This will change state with each falling clock.

$C_1$ is the basic clock, a one microsecond pulse with a periodicity of 8⅓ microseconds, as illustrated in FIGURE 3. This is counted modulo 4 to yield the word clock $C_3$ and the byte clock $C_2$. The * indicates that the term is complimented.

$Q_1 S_1 = Q_1*$
$Q_1 R_1 = Q_1$
$Q_1 T = C_1$
$Q_2 S_1 = Q_2*$
$Q_2 R_1 = Q_2$
$Q_2 T = Q_1$

The clocks are generated with the following logic:

$C_2 = Q_1 \cdot C_1$
$C_3 = Q_1 Q_2 C_1$
$C_3-1 = Q_1{}^* Q_2{}^* C_1$
$C_3-2 = Q_1 Q_2{}^* C_1$
$C_3-3 = Q_1{}^* Q_2 C_1$ The channel counter has the following logic:

$CH_0 S_1 = CH_0{}^*$
$CH_0 R_1 = CH_0$
$CH_0 T = C_3$
$CH_1 S_1 = CH_1{}^*$
$CH_1 S_2 = (CH_2{}^* + CH_3{}^* + CH_4{}^*)$
$CH_1 R_1 = CH_1$
$CH_1 T = CH_0$
$CH_2 S_1 = CH_2{}^*$
$CH_2 S_2 = CH_1$
$CH_2 R_1 = CH_2$
$CH_2 R_2 = (CH_1 + CH_3 CH_4)$
$CH_2 T = CH_0$
$CH_3 S_1 = CH_3{}^*$
$CH_3 R_1 = CH_3$
$CH_3 T = CH_2$
$CH_4 S_1 = CH_4{}^*$
$CH_4 R_1 = CH_4$
$CH_4 T = CH_3$

This generates a modulo 30 counter whose binary states range from 0–29. A new clock $C_4$ is generated, as illustrated in FIGURE 3. $C_4$ has a period of 30 $C_3$ clocks, or one millisecond.

$$C_4 = CH_0 CH_1{}^* CH_2 CH_3 CH_4 C_3$$

The data scan counter has the following logic.

$DS_0 S_1 = DS_0{}^*$
$DS_0 R_1 = DS_0$
$DS_0 T = C_4$
$DS_1 S_1 = DS_1{}^*$
$DS_1 S_2 = (DS_2{}^* + DS_3{}^* + DS_4{}^*)$
$DS_1 R_1 = DS_1$
$DS_1 T = DS_0$
$DS_2 S_1 = DS_2{}^*$
$DS_2 S_2 = DS_1$
$DS_2 R_1 = DS_2$
$DS_2 R_2 = (DS_1 + DS_3 DS_4)$
$DS_2 T = DS_0$
$DS_3 S_1 = DS_3{}^*$
$DS_3 R_1 = DS_3$
$DS_3 T = DS_2$
$DS_4 S_1 = DS_4{}^*$
$DS_4 R_1 = DS_4$
$DS_4 T = DS_3$

Certain timing signals are defined to simplify logic. They are:

$TS_1 = CH_0{}^* CH_1{}^* CH_2{}^* CH_3{}^* CH_4{}^*$ (count is zero)
$TS_2 = CH_1{}^* CH_2{}^* CH_3{}^* CH_4{}^*$ (count is zero or one)
$TS_3 = DS_0 DS_2 DS_3 DS_4$ (count is 29, or maximum)
$TS_4 = DS_0{}^* DS_1{}^* DS_2{}^* DS_3{}^* DS_4{}^*$ (count is zero, or release)

*Timing*

The following sequence of events occur.

$C_3$ causes CH to count
$C_3$ also initiates the A/D conversion (the converter has a full cycle of 9 microseconds, and is stabilized by $C_3-2$)
$C_3-1$ reset $QR_0-QR_{15}$
$C_3-2$ copies the digitized data from A/D converter to $QR_1-QR_{15}$
$C_3-2$ copies gain change data into $QR_0$
$C_3-3$ shifts $QR_1-QR_{15}$ left or right one bit, if necessary (CDD), (SDL), (SDR)
$C_3$ copies $QR_{15}-QR_8$ to $QRB_7-QRB_0$
$C_3$ copies $QR_7-QR_0$ to $QRA_7-QRA_0$
$C_3-2$ copies $QRA_7-QRA_0$ to $QRB_7-QRB_0$ The logic for $QR_1-QR_{15}$ is substantially the same for all bits.

$QR_n S_1 = (CDD) ADC_n + (SDL) QR_{n-1} + (SDR) QR_{n+1} + (FD_n)$
$QR_n R_1 = Q_1{}^* Q_2{}^* + (SDL) QR_{n-1} + (SDR) QR_{n+1} + (FD_n)$
$QR_n T = C_3-1 + C_3-2 + C_3-3$
$FD_n = TS_2 (8 \leq n \leq 15)$
$FD_n = TS_1 + TS_2 (GBGJ_n)$ $(0 \leq n \leq 7)$ where $GBGJ_n$ represents the gated bit of the Jth binary gain register.

The contents of the DS counter is represented by "J."

For $J=29$, $GBG_{290}-GBG_{294} \equiv 1$ (end of data scan)
For $J=0$, $GBG_{07} \equiv 1$ (up counter bit for first data scan of a gain scan)

CDD is copy data from A/D converter:

$CDD = Q_2{}^* Q_1 TS_2{}^*$

SDR is shift data right in $QR_n$.

$$SDR = Q_2 Q_1{}^* GCUGRI{}^*$$

(GCU control shift right.)

The data is copied to $QRA_0-QRA_7$, $QRB_0-QRB_7$ to drive the recorder.

$QRA_n S_1 = QRA_n$ $(0 \leq n \leq 7)$
$QRA_n R_1 = QRA_n{}^*$
$QRA_n T = C_3$
$QRB_n S_1 = Q_2 QR_{n+8} + Q_2{}^* QRA_n$ $(0 \leq n \leq 7)$
$QRB_n R_1 = Q_2 QR_{n+8} + Q_2{}^* QRA_n{}^*$
$QRB_n T = C_2$ The ouput of $QRB_n$ drives the recorder, with data being changed by $C_2$.

Add extra term GXC to $QRA_0 S_1$, as disclosed herein below:

*Binary gain register*

Each binary gain amplifier has three separate functions. These are:

Digital control and communication with central processor;
A binary gain register holding the specified gain; and
An amplifier with switchable gains (in powers of two).

When decoding channels, counts 2–25 correspond to data channels 0–23. Thus $GBD_n$ is true if the count in the channel counter is $n+2$. When a channel is specified, the digitized data is examined to see if it exceeds one half and a down scan is present ($TS_4{}^*$). This is GCD, and causes the $BG_n$ counter to increment. If $TS_4$ (release) and $BGR_n$ is false, i.e., the data never exceeded ¼, $GCU_n$ is generated and the $BG_n$ counter is decremented. It is apparent that $BG_n$ cannot go below zero or above a maximum.

In a similar manner, the data scan counter reads $BG_n$ in data in data scan "$n$" to write the value of word "2" (frame data).

*Special functions*

$BGR_n$ $(0 \leq n \leq 23)$ a flip flop associated with each of the binary gain registers which determines if the magnitude of the digitized data has exceeded ¼ (release condition) during the 30 millisecond gain scan GRR generates a reset for all $BGR_n$ during word 29 of the first data scan of a gain scan
GSR generates a set for a specified $BGR_n$ if the magnitude of the digitized data exceeds ¼
$GCU_n$ generates count up (release)
GCD generates count down (attack)
$GBD_n$ generates binary decode of $(N+2)$
$C_3-3S$ is a special $C_3-3$ clock to keep the binary gain register from counting below zero or above a maximum quantity.

Logic for binary gain register:

$BGN_0S_1 = BGN_0*$
$BGN_0S_2 = GBD_n(GCU+GCD)$
$BGN_0R_1 = BGN_0$
$BGN_0R_2 = GBD_n(GCU+GCD)$
$BGN_0T = C_3\text{-}3S$
$BGN_1S_1 = BGN_1*$
$BGN_1S_2 = GBD_nGCB_{n1}$
$BGN_1R_1 = BGN_1$
$BGN_1R_2 = GBD_nGCB_{n1}$
$BGN_1T = C_3\text{-}3S$
$BG_{n2}S_1 = BG_n2*$
$BG_{n2}S_2 = GBD_nGCB_{n2}$
$BG_{n2}R_1 = BGN_2$
$BG_{n2}R_2 = GBD_nGCB_{n2}$
$BG_{n2}T = C_3\text{-}3S$
$BGN_3S_1 = BGN_3*$
$BGN_3S_2 = GBD_nGCB_{n3}$
$BGN_3R_1 = BGN_3$
$BGN_3R_2 = GBD_nGCB_{n3}$
$BGN_3T = C_3\text{-}3S$
$BGN_4S_1 = BGN_4*$
$BGN_4S_2 = GBD_{n4}GCB_{n4}$
$BGN_4R_1 = BGN_4$
$BGN_4R_2 = GBD_nGCB_{n4}$
$BGN_4T = C_3\text{-}3S$

*Logic for the up/down counter of binary gain register*

$GCB_{n0}$ generates a count in bit 0 of channel $n$.

$GCB_{n1} = GCU_nBGN_0 + GCDBGN_0*$
$GCB_{n2} = GCU_nBG_{n0}BG_{n1} + GCDBGN_0*BGN_1*$
$GCB_{n3} = GCU_nGBN_0BGN_1GBN_2$
$\qquad + ACDBGN_0*BGN_1*BGN_2*$
$GCB_{n4} = GCU_nBGN_0BGN_1BGN_2BGN_3$
$\qquad + GCDBGN_0*BGN_1*BGN_2*BGN_3*$
$C_3\text{-}3S = C_3\text{-}3(GCDBGN_0*BGN_1*BGN_2*BGN_3*BGN_4*$
$\qquad + GCU_n \text{ max. allowable value})$
$GCU_n = TS_4BGR_n*$ $$ACU = TS_4GRI\sum_n GCU_n$$

$GXC_n$ is generate exponent change for channel "$n$."

$$GXC_n = GBD_n(GCU_n+GCD)$$

GCD is generate exponent change down (attack).

$$GCD = (QR_{15}QR_{14}* + QR_{15}*QR_{14})TS_4*GRI$$

GXC = generate exponent change.

$$GXC = (GSC_d + GXC_{u0} + GXC_{u1} + GXC_{u23}TS_2*GRI$$

$BGR_n$ is the release control flip flop for channel "$n$." It specifies whether the magnitude of the digitized data ever exceeded ¼ during the gain scan. If not, the term $GCU_n$ (release) is generated during the first data scan of a gain scan. All $BGR_n$ are reset by GRR at the end of data scan "1."

$$GRR = TS_4TS_2TS_1*$$

During the remainder of the data scans, $BGR_n$ can be set by $C_3$-2 if $GBD_n$ (the right channel) and GSR (the data exceeds ¼).

$GSR = ADC_{15}*(ADC_{14}+ADC_{13})$
$\qquad + ADC_{15}(ADC_{14}*+ADC_{13}*)$

If $BGR_n$ is not on, $TS_4$ can generate an incrementing signal $GCU_n$.

$$GCU_n = TS_4BGR_n*$$

GRI is generate register inhibit. If data tries to force a binary gain register beyond limits, the term GRI becomes of value. It inhibits the register from going out of limits, the associated data from shifting, and the gain change bit from being written.

$GRI = TS_4*GBD_nBGN_0*BGN_1*BGN_2*BGN_3*BGN_4*$
$\qquad + TS_4GBD_n \text{ (max value)}_n$ Modification of this invention not described herein will become apparent to those skilled in the art. Therefore it is intended that the matter contained in the foregoing description and the accompanying drawings be interpreted as illustrative and not limiting, the scope of the invention being defined in the appended claims.

What I claim is:

1. In a method for digitally recording seismic data from a plurality of analog channels, each channel including a variable-gain amplifier for suitably amplifying the input analog data, the steps of:
   providing several recording tracks on a tape;
   adjusting initially the gain of the amplifier to an initial gain value;
   digitizing the output of the amplifier to provide a multi-bit digital data level indication;
   providing at least a 1-bit digital indication of a change in the amplifier gain;
   combining the 1-bit indication with the multibit data level indication to provide a digital word; and
   recording on the tape the digital word in at least 2 bytes.

2. In the method of claim 1,
   providing on said tape at least 9 tracks;
   digitizing the output of the amplifier to provide at least a 15-bit data level indication; and
   combining the 1-bit indication with the 15-bit data level indication to provide a 16-bit word.

3. In the method of claim 1,
   determining the cumulative effect of the gain changes that have occurred since the recording of the initial gain value;
   combining the initial gain value with the cumulative effect to obtain the actual gain of the amplifier; and
   periodically recording the actual gain of the amplifier on the tape.

4. In the method of claim 3,
   sequentially recording the 16-bit word from each channel to provide a data scan.

5. In the method of claim 4,
   periodically inserting suitable digital identification data on said tape.

6. In the method of claim 1,
   digitally recording said initial gain value of said variable gain amplifier on said tape.

References Cited

UNITED STATES PATENTS 3,241,100    3/1966    Loofbourrow _____ 340—15.5

RODNEY D. BENNETT, *Primary Examiner.*

C. E. WANDS, *Assistant Examiner.*